US012223348B2

(12) United States Patent
Kim

(10) Patent No.: US 12,223,348 B2
(45) Date of Patent: Feb. 11, 2025

(54) CONTROLLER FOR PERFORMING COMMAND SCHEDULING, STORAGE DEVICE INCLUDING THE CONTROLLER, AND OPERATING METHOD OF THE CONTROLLER

(71) Applicant: SAMSUNG ELECTRONICS CO., LTD., Suwon-si (KR)

(72) Inventor: Youngil Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 696 days.

(21) Appl. No.: 17/376,942

(22) Filed: Jul. 15, 2021

(65) Prior Publication Data

US 2022/0129310 A1    Apr. 28, 2022

(30) Foreign Application Priority Data

Oct. 28, 2020    (KR) .................. 10-2020-0141571

(51) Int. Cl.
*G06F 9/48*    (2006.01)
*G06F 9/50*    (2006.01)
(Continued)

(52) U.S. Cl.
CPC .......... *G06F 9/4881* (2013.01); *G06F 9/5072* (2013.01); *G06F 9/52* (2013.01); *G06F 9/546* (2013.01)

(58) Field of Classification Search
CPC ............................................ G06F 9/4881–546
See application file for complete search history.

(56) References Cited

U.S. PATENT DOCUMENTS 5,905,793 A    5/1999 Flockhart et al.
6,603,772 B1    8/2003 Moussavi et al.
(Continued)

FOREIGN PATENT DOCUMENTS

JP    2003051839 A    2/2003
JP    2014119860 A    6/2014
(Continued)

OTHER PUBLICATIONS

Pinpointing and scheduling access conflicts to improve internal resource utilization in solid-state drives Xuchao Xie, Liquan Xiao, Dengping Wei, Qiong Li, Zhenlong Song, Xiongzi Ge (Year: 2018).*

(Continued)

*Primary Examiner* — Emerson C Puente
*Assistant Examiner* — Paul V Mills
(74) *Attorney, Agent, or Firm* — Sughrue Mion, PLLC

(57) ABSTRACT

A storage device communicates with a host device that generates an original packet. The storage device includes a memory device including a die having multiple planes, and a controller. The controller includes; an operation checker that receives the original packet indicating a simultaneous parallel work request that occupies at least two planes among the multiple planes, wherein the operation checker sets a simultaneous parallel identifier associated with the original packet to generate a modified packet, an operation distributor that stores the modified packet in at least one virtual output queue of a virtual queue cluster, and a scheduler that transmits the modified packet to at least one plane among the multiple planes occupied by the simultaneous parallel work request according to a scheduling policy.

17 Claims, 11 Drawing Sheets

(51) Int. Cl.
    *G06F 9/52*     (2006.01)
    *G06F 9/54*     (2006.01)

(56) References Cited

U.S. PATENT DOCUMENTS

| | | | |
|---|---|---|---|
| 7,675,910 B2 | 3/2010 | Van Wageningen et al. | |
| 8,571,024 B2 | 10/2013 | Tatar et al. | |
| 8,713,295 B2 | 4/2014 | Bax et al. | |
| 9,229,854 B1* | 1/2016 | Kuzmin | G06F 3/0679 |
| 9,774,461 B2 | 9/2017 | Srinivasan | |
| 9,870,327 B2 | 1/2018 | Chen et al. | |
| 10,270,713 B2 | 4/2019 | Srinivasan et al. | |
| 10,423,361 B2* | 9/2019 | Badam | G06F 9/545 |
| 2004/0017804 A1 | 1/2004 | Mshnu | |
| 2018/0113803 A1* | 4/2018 | Kim | G06F 3/061 |
| 2018/0150242 A1 | 5/2018 | Yi et al. | |
| 2018/0188970 A1* | 7/2018 | Liu | G06F 3/0653 |
| 2018/0300933 A1 | 10/2018 | Burke et al. | |
| 2018/0321945 A1 | 11/2018 | Benisty | |
| 2019/0163396 A1* | 5/2019 | Jo | G06F 3/061 |
| 2019/0227745 A1 | 7/2019 | Hong et al. | |
| 2019/0227749 A1* | 7/2019 | Wakchaure | G06F 3/0604 |
| 2019/0324647 A1 | 10/2019 | Shin | |
| 2020/0065024 A1* | 2/2020 | Park | G06F 3/0688 |
| 2022/0043600 A1* | 2/2022 | Moon | G06F 3/061 |

FOREIGN PATENT DOCUMENTS

| | | |
|---|---|---|
| JP | 6646754 B2 | 2/2020 |
| KR | 1019980080016 | 11/1998 |
| KR | 100346191 | 7/2002 |
| KR | 101441872 | 9/2014 |

OTHER PUBLICATIONS

FLIN: Enabling Fairness and Enhancing Performance in Modern NVMe Solid State Drives Arash Tavakkol, Mohammad Sadrosadati, Saugata Ghose, Jeremie S. Kim, Yixin Luo, Yaohua Wang, Nika Mansouri Ghiasi et al. (Year: 2018).*
An Efficient Parallel Executing Command Scheduler for NAND Flash Storage Systems Wei Yan, Yu Liu, Xuguang Wang (Year: 2013).*
Improving the SSD Performance by Exploiting Request Characteristics and Internal Parallelism Bo Mao, Suzhen Wu, and Lide Duan (Year: 2018).*
LightNVM: The Linux Open-Channel SSD Subsystem Matias Bjørling, Javier González, Philippe Bonnet (Year: 2017).*
Optimizing Host-level Flash Translation Layer with Considering Storage Stack of Host Systems Jhuyeong Jhin, Hyukjoong Kim, Dongkun Shin (Year: 2018).*
European Office Action Dated Jan. 24, 2023, Cited in Corresponding European Application No. 21189113.0.
European Search Report Dated Feb. 9, 2022, Cited in Corresponding European Application No. 21189113.0.

* cited by examiner

FIG. 10

| Plane1 | Plane2 | Plane3 | Plane4 |
|---|---|---|---|
| 0 | 1 | 0 | 1 |
| PB_VQ1 | PB_VQ2 | PB_VQ3 | PB_VQ4 |
| 1111 | 0010 | 1100 | 0000 |
| VTS | Bar_4P | Bar_2P_12 | Bar_2P_34 |
| 1024 | 1 | 0 | 1 | ial, information
CONTROLLER FOR PERFORMING COMMAND SCHEDULING, STORAGE DEVICE INCLUDING THE CONTROLLER, AND OPERATING METHOD OF THE CONTROLLER

CROSS-REFERENCE TO RELATED APPLICATION

This application claims priority under 35 U.S.C. § 119 to Korean Patent Application No. 10-2020-0141571 filed on Oct. 28, 2020 in the Korean Intellectual Property Office, the subject matter of which is hereby incorporated by reference.

BACKGROUND

The inventive concept relates to controllers, and more particularly, to controllers capable of performing command scheduling. The inventive concept also relates to storage devices including this type of controller, as well as related operating methods for the controller.

A storage device may use various scheduling policies to effectively schedule commands received from a host device.

Scheduling policies should ensure fairness among multiple hosts and prevent head-of-the-line (HOL) blocking which may occur during processing a particular command. However, if a command is received—the execution of which will occupy multiple resources, and if a scheduling priority for the command is not appropriately considered during the scheduling of the command among other commands—a resource starvation phenomenon (hereafter, "resource starvation") associated with the command may occur.

SUMMARY

Embodiments of the inventive concept provide controllers capable of performing command scheduling by considering priority of a command indicating simultaneous parallel work occupying multiple resources. Embodiments of the inventive concept also provide storage devices including this type of controller, as well as related operating methods for the controller.

According to an aspect of the inventive concept, there is provided a storage device communicating with a host device that generates an original packet. The storage device includes a memory device including a die having multiple planes, and a controller. The controller includes; an operation checker that receives the original packet indicating a simultaneous parallel work request that occupies at least two planes among the multiple planes, wherein the operation checker sets a simultaneous parallel identifier associated with the original packet to generate a modified packet, an operation distributor that stores the modified packet in at least one virtual output queue of a virtual queue cluster, and a scheduler that transmits the modified packet to at least one plane among the multiple planes occupied by the simultaneous parallel work request according to a scheduling policy.

According to an aspect of the inventive concept, there is provided a controller in a storage device configured to communicate with a plurality of host devices, wherein each one of the plurality of host devices is configured to generate an original packet indicating a work request. The controller includes; an operation checker configured to determine whether a work request received from one of the plurality of host devices is a simultaneous parallel work request or a single work request, and generate a modified packet by adding a simultaneous parallel identifier to the original packet upon determining that the work request received from the host device is a simultaneous parallel work request, a virtual queue cluster including a first virtual output queue and a second virtual output queue, a queue controller configured to store the modified packet in the first virtual output queue based on information associated with the modified packet; and a scheduler configured to store the modified packet in a memory device according to a scheduling policy, wherein the scheduling policy is defined by at least one of a state of the simultaneous parallel identifier, information associated with the work request received from the host device, change information associated with at least one of the first virtual output queue and the second virtual output queue, and plane information associated with multiple planes of the memory device, wherein execution of the simultaneous parallel work request occupies at least two planes among the multiple planes, and execution of the single work request occupies only a single plane among the multiple planes.

According to an aspect of the inventive concept, there is provided a method of operating a controller in a storage device communicating with a host device that generates an original packet, wherein the storage device includes a memory device including a die having multiple planes and the controller. The method includes; receiving the original packet indicating a simultaneous parallel work request, adding a simultaneous parallel identifier to the original packet to generate a modified packet, storing the modified packet in at least one virtual output queue of a virtual queue cluster, and transmitting the modified packet to at least one plane among the multiple planes according to a scheduling policy, wherein execution of the simultaneous parallel work request occupies at least two planes among the multiple planes.

BRIEF DESCRIPTION OF THE DRAWINGS

Embodiments of the inventive concept will be more clearly understood upon consideration of the following detailed description in conjunction with the accompanying drawings in which:

FIG. 10 is a conceptual diagram further illustrating a method of operating the schedule manager 253 of FIG. 9;

DETAILED DESCRIPTION

Hereinafter, embodiments of the inventive concept will be described in some additional detail with reference to the accompanying drawings.

Figure 1:
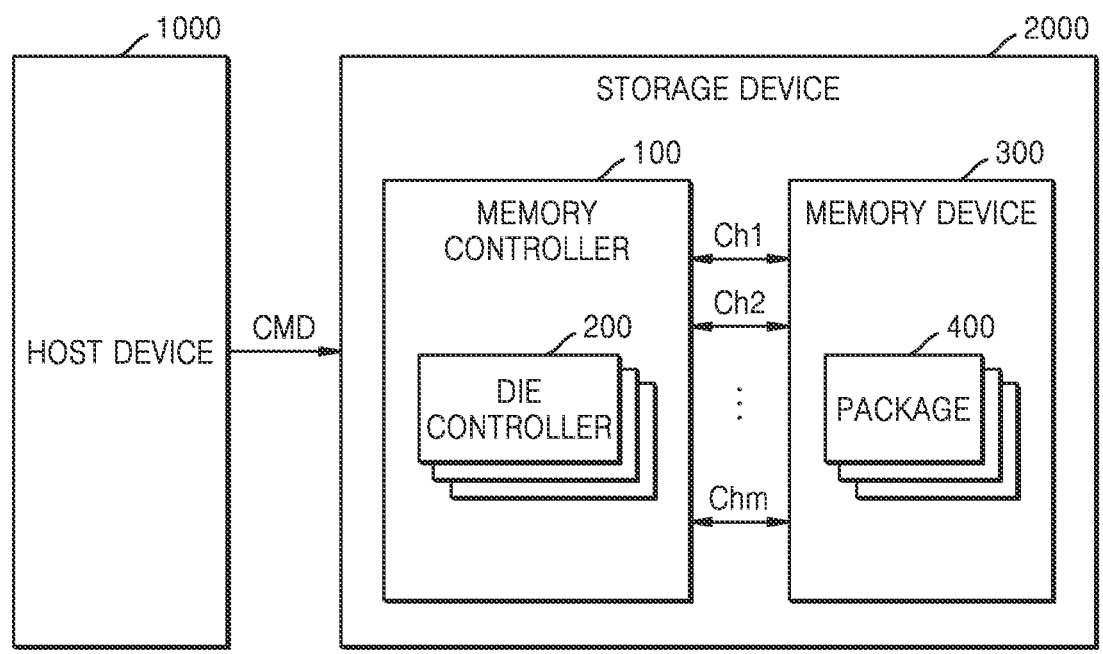
FIG. 1 is a block diagram illustrating a data processing system 10 according to embodiments of the inventive concept.

FIG. 1 is a block diagram illustrating a data processing system 10 according to embodiments of the inventive concept.

Referring to FIG. 1, the data processing system 10 may generally include a host device 1000 and a storage device 2000, wherein the storage device 2000 may include a memory controller 100 and a memory device 300.

The host device 1000 may communicate (e.g., transmit and/or receive) one or more command(s) (CMD) with the storage device 2000 in response to one or more user request(s). In response to the command(s), the storage device 2000 may perform one or more operation(s). Here, the term "command" should be broadly construed to include not only various type of commands commonly used in data processing systems, but also work request(s).

The storage device 2000 may include storage media in which data may be stored (e.g., programmed or written to) in response to command(s) received from the host device 1000. In some embodiments, the storage device 2000 may include one or more solid state drives (SSDs). When the storage device 2000 includes an SSD, the memory device 300 may include multiple flash memory chips (e.g., NAND memory chips) respectively capable of storing data in a non-volatile manner. Hence, in various embodiments, the memory device 300 may include a single flash memory chip, multiple flash memory chips, and/or a memory card including one or more flash memory chips.

For embodiments in which the storage device 2000 includes flash memory, the flash memory may be arranged as a two-dimensional (2D) NAND memory array or as a 3D (or vertical) NAND (VNAND) memory array. Here, a 3D NAND memory array may be monolithically formed in at least one physical level of a circuit disposed on a substrate, as a circuit related to an operation of arrays of memory cells having an active area and arranged on a silicon substrate or an operation of the memory cells. In this regard, the term "monolithic" indicates that layers of each level constructing the array are stacked directly on layers of lower levels in the array.

In some embodiments, the 3D NAND memory array may include VNAND strings arranged in a vertical direction with respect to a substrate, such that at least one memory cell is vertically disposed above another memory cell. Here, the memory cell(s) associated with a VNAND string may include a charge trap layer. In this regard, the collectively subject matter of U.S. Pat. Nos. 7,679,133; 8,553,466; 8,654,587 and 8,559,235, as well as published U.S. Patent Application No. 2011/0233648 are incorporated by reference and describe various features of a 3D memory array including multiple levels and having shared word lines and/or bit lines between the multiple levels.

Alternately, the storage device 2000 may one or more types of non-volatile memory other than flash memory including, for example; magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), a nano floating gate memory (NFGM), a holographic memory, a molecular electronics memory, an insulator resistance change memory, etc.

In some embodiments, the memory device 300 may be an embedded multi-media card (eMMC) or embedded universal flash storage (UFS) memory device. For example, the memory device 300 may be an attachable/detachably memory device associated with the storage device 2000 including, for example; a UFS memory card, a compact flash (CF) card, a secure digital (SD) card, a micro-SD card, a mini-SD card, an extreme digital (xD) card, a memory stick, etc.

In some embodiments, the memory device 300 may include multiple memory blocks, wherein each memory block includes at least one page, and each page includes memory cells connected to word lines.

In the illustrated embodiment of FIG. 1, the memory device 300 may include one or more package(s) 400, wherein each package includes one or more dies, and wherein each die includes multiple planes.

The memory controller 100 may include multiple channel controllers (e.g., 120, 130, and 140 of FIG. 2), wherein the channel controllers may respectively communicate with the package(s) 400 of the memory device 300 via channels (e.g., Ch1, Ch2 . . . Chm). As will be described hereafter in some additional detail, each channel controller (e.g., 120, 130, and 140 of FIG. 2) may include multiple die controllers (e.g., 200 of FIG. 2), wherein each die controller 200 may be used to respectively control one or more of the dies (e.g., 411 of FIG. 2) in the package(s) 400.

Referring to FIG. 1, the memory controller 100 and the memory device 300 may variously communicate command(s), address(es), and/or data via one or more of the channels (e.g., channels Ch1, Ch2 . . . Chm) associated with the storage device 2000.

The host device 1000 may communicate with the storage device 2000 using one or more interfaces, such as, for example; a universal serial bus (USB) interface, a multimedia card (MMC) interface, a peripheral component interconnect express (PCI-E) interface, an advanced technology attachment (ATA) interface, a serial ATA (SATA) interface, a parallel ATA (PATA) interface, a small computer system interface (SCSI), a serial attached SCSI (SAS), an enhanced small disk interface (ESDI), an integrated drive electronics (IDE) interface, a non-volatile memory express (NVMe) interface, etc.

In some embodiments, the memory controller 100 may determine (or check) whether a particular command received from the host device 1000 is a "simultaneous parallel work request." In this regard, a simultaneous parallel work request is a request that will "occupy" (e.g., consume the operating capabilities of) multiple resources within the memory device 300. In contrast to a simultaneous parallel work request, a "single work request" is a request that will occupy a single resource within the memory device 300. In this regard, the term "resource" may be variably defined according to system capabilities, but may include, for example; a circuit, a signal path, a channel, processing time, power, a memory, a memory region, a memory plane, a buffer, etc. In general, one or more resource(s) will be occupied during the completion of a work request.

Those skilled in the art will recognize that a data processing system must continuously allocate resources among a variety of incoming work requests. Indeed, the data processing system may receive a store a number of work requests. The resource allocation process may be complicated by differing priorities associated with different work requests. And this is particularly true when multiple hosts may communicate work requests to a storage device. Hence, the memory controller 100 of FIG. 1 may generate a "scheduling policy" in order to properly and efficiently manage the allocation of resources in view of a received work requests. In this regard, the generation of the scheduling policy by the memory controller 100 must take into account the challenges associated with receipt of a simultaneous parallel work request. For example, the memory controller 100 may assign a higher priority to a simultaneous parallel work request, as compared with single work requests, when generating the scheduling policy in order to avoid the resource starvation in relation to the simultaneous parallel work request.

Figure 2:
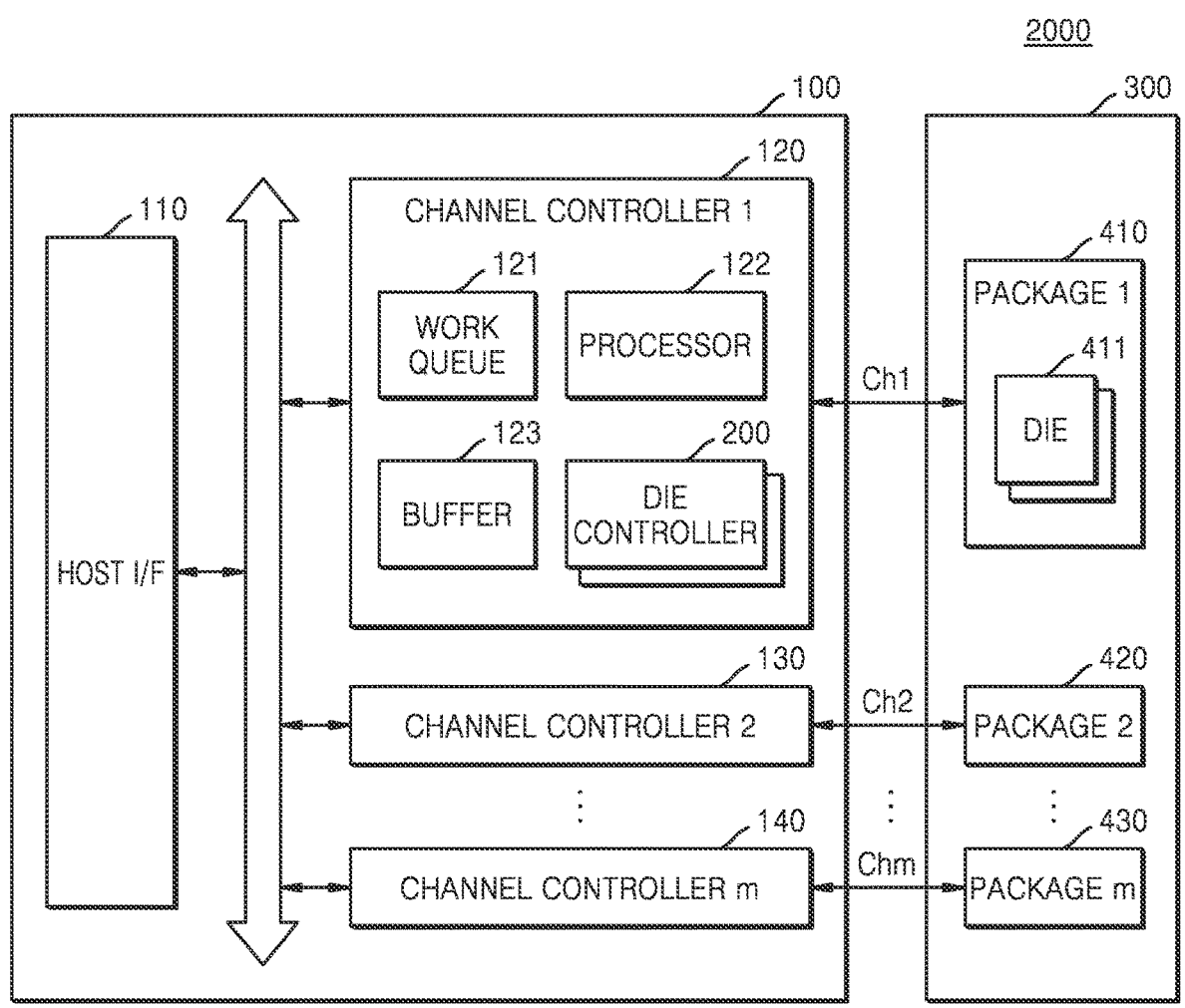
FIG. 2 is a block diagram further illustrating in one example the storage device 2000 of FIG. 1.

FIG. 2 is a block diagram further illustrating in one example the storage device 2000 of FIG. 1.

Referring to FIGS. 1 and 2, the memory controller 100 is assumed to receive a command from the host device 1000, and access the memory device 300 in response to the command.

Here, the memory controller 100 may include a host interface (I/F) 110 and multiple channel controllers (e.g., 120, 130, and 140). The host I/F 110 and the channel controllers 120, 130, and 140 may be electrically connected via a bus, such that the bus forms a transmission path through which information (e.g., request(s), data, address(es), control signal(s) and/or command(s)) may be communicated between the memory controller 100 and the host device 1000.

Thus for the sake of simplicity of explanation in the illustrated example of FIG. 2, the storage device 2000 is assumed to operate in relation to m channels (e.g., Ch1 to Chm), the memory controller 100 is assumed to include m channel controllers (e.g., channel controller 1 to channel controller m) respectively associated with each of the m channels, and the memory device 300 is assumed to include m packages (e.g., package 1 to package m) respectively associated with each of the m channels, where 'm' is a positive integer greater than 1. However, those skilled in the art will recognize that any reasonable number of channels, channel controllers and packages may be variously provided and differently operated within embodiments of the inventive concept. Hereinafter, a first channel controller 120 among the channel controllers, and a first package 410 among the packages will be described as working examples.

Thus, the first channel controller 120 communicates with the first package 410 of the memory device 300 via a first channel Ch1. In this regard, the channel controller 120 is assumed to include a work queue 121, a processor 122, a buffer 123, and die controllers 200. Further, the first package 410 is assumed to include four (4) dies (see, DIE 1, DIE 2, DIE 3 and DIE 4 of FIG. 3). However, those skilled in the art will recognize that the channel controller 120 may be variously implemented in hardware, firmware and/or software, and any reasonable number of dies may be included in a package.

The work queue 121 may be used to temporarily store a work request(s) and other types of command(s) received from the host device 1000.

The processor 122 may be used to control the overall operation of the channel controller 120. For example, the processor 122 may execute one or more program(s) stored in read-only memory (ROM) (not shown) to control the operation of the channel controller 120 and/or the die controller 200.

The buffer 123 may be used to temporarily store data received from the host device 1000 via the host I/F 110 and/or data received from the memory device 300.

The die controller 200 may communicate one or more instruction(s) associated with a work request received from the host device 1000 to a corresponding first die 411 in the package 410 through the first channel Ch1. That is, a scheduling policy may be generated to manage the communication of instructions to the die 411. In this regard, the die controller 200 of FIG. 2 may differently process each work request (and/or command(s)) received from the host device 100 in relation to a number of planes included in the first die 411, as the various planes may be differently occupied by the received work request. For example, the die controller 200 may generate the scheduling policy upon considering whether the work request is a single work request or a simultaneous parallel work request. An exemplary method of operating the die controller 200 will be described in some additional detail in relation to FIG. 4.

Figure 3:
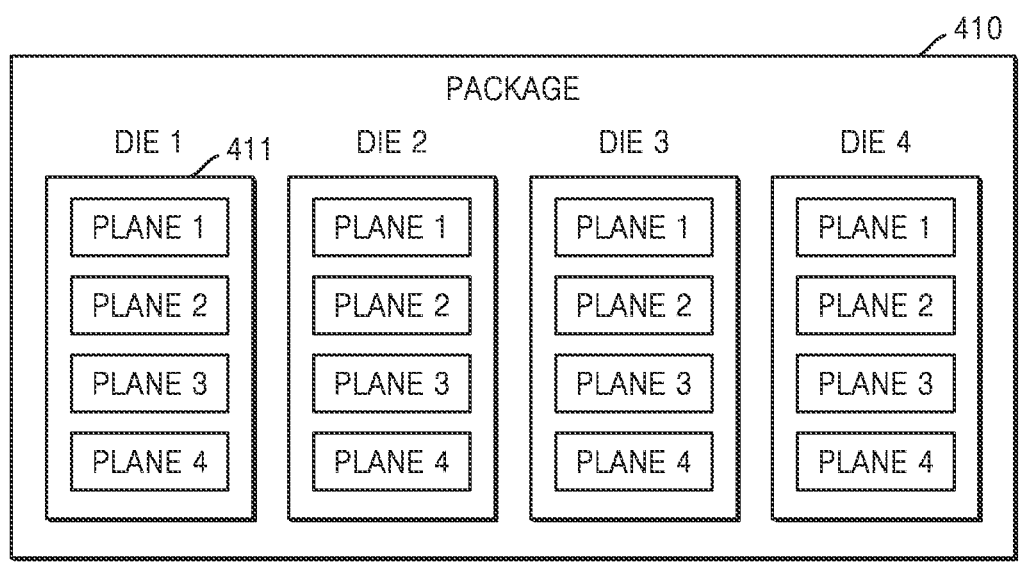
FIG. 3 is a conceptual diagram further illustrating in one example the package 400 of FIGS. 1 and 2.

FIG. 3 is a conceptual diagram further illustrating in one example the first package 410 of FIG. 2.

Referring to FIG. 2, the four planes of the first die 411 may simultaneously perform the same type of operation. Thus, in some embodiments, the first die 411 may independently and simultaneously perform four NAND operations in respective relation to the four planes. In this regard, a single work request may be used to perform one NAND operation occupying any one of the planes in the first die 411, while a simultaneous parallel work request may be used to simultaneously perform two or more of the same type of NAND operation respectively occupying two or more of the four planes of the first die 411.

Figure 4:
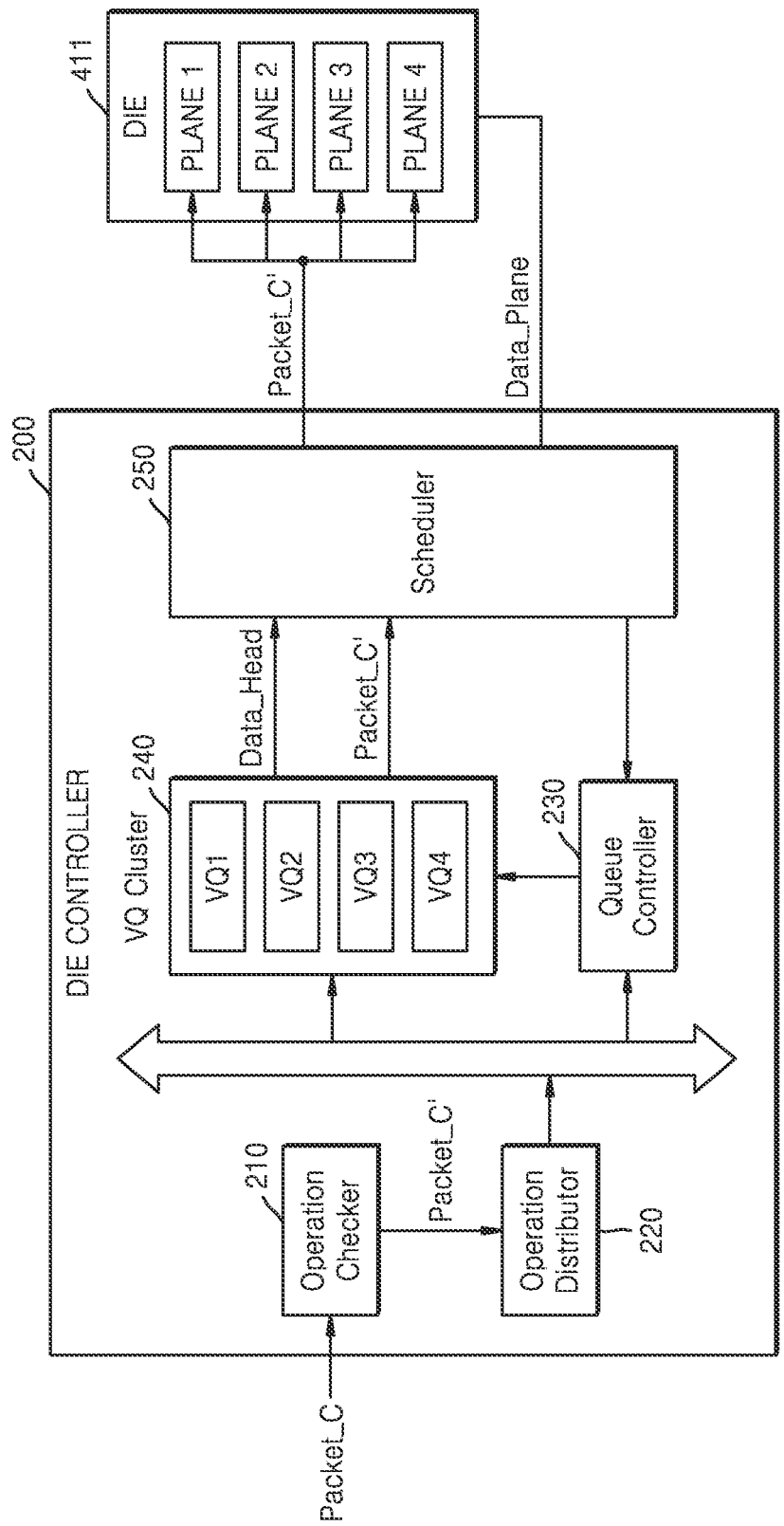
FIG. 4 is a block diagram further illustrating in one example the die controller 200 of FIG. 2.

FIG. 4 is a block diagram further illustrating the die controller 200 of FIG. 2.

Referring to FIGS. 1, 2 and 4, the storage device 2000 may generate an "original" packet (e.g., Packet_C) in response to (or based on) a command (e.g., a work request) received from the host device 1000. For example, when the command is a read command indicating a read operation or a write command indicating a write operation, Packet_C may be an input/output (I/O) request packet. That is, the original packet Packet_C may include information corresponding to a type of command received from the host device 1000.

Once the die controller 200 receives Packet_C, it may forward (e.g., transmit, queue (or store)—hereafter singularly or collectively referred to as "store") Packet_C to a plane of the die 411 indicated by the Packet_C.

In some embodiments like the one illustrated in FIG. 4, the die controller 200 may include an operation checker 210, an operation distributor 220, a queue controller 230, a virtual queue cluster 240 and a scheduler 250.

Extending the operational example described above, the operation checker 210 may check whether Packet_C is a single work request or a simultaneous parallel work request. (Thus, an original packet associated with (or indicating) a single work request may be referred to as a "single packet", and an original packet associated with (or indicating) a simultaneous parallel work request may be referred to as a "simultaneous parallel packet."

In this regard, the operation checker 210 may generate a "modified packet" from the original packet by adding (or setting) an identifier associate with Packet_C. For example, when Packet_C is associated with a simultaneous parallel work request an appropriate identifier may be added (or set) to indicate a simultaneous parallel packet. Here, the "identifier" may be a single data bit (0 or 1), a text message, etc.

(Hereafter, the identifier may be referred to as a "simultaneous parallel identifier"). In this regard, the simultaneous parallel identifier may be omitted from a single packet, but added to a simultaneous parallel packet. Hereinafter, in some embodiments, the notation Packet_C' is used to denote a modified (or identifier-added, or identifier set) version of the original packet Packet_C.

Once Packet_C' has been generated by the operation checker, the operation distributor 220 may store Packet_C' to the virtual queue cluster 240 via one or more intervening bus(es). In this regard, the operation distributor 220 may check certain information included Packet_C' to determine where to store Packet_C'. For example, the operation distributor 220 may refer to information included in a single packet or information included in a simultaneous parallel packet in order to determine whether there a simultaneous parallel identifier has been added.

The operation distributor 220 may then selectively (forward and) store (e.g., to one of multiple "virtual output queues") a single packet not including the simultaneous parallel identifier or a simultaneous parallel packet including the simultaneous parallel identifier.

In this regard, a virtual output queue receiving Packet_C' may be determined in relation to a plane to be occupied by Packet_C'. Alternately, a virtual output queue (receiving and) storing Packet_C' may be determined in relation to the type (or nature) of Packet_C as generated by the host device 1000.

The operation distributor 220 may also transmit an updated command to the queue controller 230 so that Packet_C' may be stored in the appropriate virtual output queue. Accordingly, the queue controller 230 may be used to store (or push, or enqueue) Packet_C' in a corresponding virtual output queue.

The virtual queue cluster 240 may include multiple, virtual output queues. Each virtual output queue may be used to store Packet_C', when forwarded from the operation distributor 220. A head portion of each virtual output queue may be referred to as a "head," and a tail portion may be referred to as a "tail." For example, when multiple packets are stored in a virtual output queue, a "first packet" (e.g., a first stored packet) may be located at the head of the virtual output queue, and "last packet" (e.g., a last stored packet) may be located at the tail of the virtual output queue.

As noted above, the virtual output queue storing Packet_C' may be determined in relation to the plane to be occupied by Packet_C'. For example, referring to FIG. 4 and assuming a single work request (or multiple single work requests), a packet occupying a first plane (Plane1) may be stored in a first virtual output queue VQ1, a packet occupying a second plane (Plane2) may be stored in a second virtual output queue VQ2, a packet occupying a third plane (Plane3) may be stored in a third virtual output queue VQ3, and a packet occupying a fourth plane (Plane4) may be stored in a fourth virtual output queue VQ4. However, again referring to FIG. 4 and assuming a simultaneous parallel work request (or multiple simultaneous parallel work requests), a packet occupying the first plane and the second plane may be stored in the first virtual output queue VQ1, and a packet occupying the third plane and the fourth plane may be stored in the third virtual output queue VQ3. However, this is just one example of a rule governing the storing of Packet_C' in a particular virtual output queue, and embodiments of the invention concept are not limited thereto.

In response to the storing of a packet in particular virtual output queue(s), the virtual queue cluster 240 may provide the scheduler 250 with (head) change information regarding change(s) to the head(s) of the virtual output queue(s) resulting from the storing of the packet under the control of the queue controller 230. For example, the virtual queue cluster 240 may provide the scheduler 250 with head change information (Data_Head) associated with Packet_C'—now located at the head of the virtual output queue(s). Head change information may further include the information about the packet located at the head of the virtual output queue(s).

Although FIG. 4 illustrates an example including a single queue cluster 240, the die controller 200 may alternately include multiple queue clusters 240. For example, when the storage device 2000 is configured to receive commands (e.g., work request) from more than one host devices, the die controller 200 may correspondingly include respective queue clusters 240 for each of the host devices. This case will be described in some additional detail with reference to FIG. 12.

Returning to FIG. 4, the scheduler 250 may receive the head change information (Data_Head) from the virtual queue cluster 240 associated with the storing of Packet_C', now located at the of the virtual output queue(s). The scheduler 250 may also receive plane status information (Data_Plane) from the die 411. For example, the scheduler 250 may receive a busy signal when a plane is performing another operation (e.g., an operation not related to Packet_C') or an idle signal when a plane is not performing another operation. Additionally or alternatively, the scheduler 250 may receive other information from the plane(s) associated with the storing of Packet_C'.

In this regard, the scheduler 250 may manage the head change information (Data_Head) and, where appropriate, generate a scheduling policy for virtual output queue(s) in response to the head change information (Data_Head). Here, the scheduling policy may indicate a scheduling policy for the transmitting of Packet_C' stored in the virtual output queue(s) to the memory device 300. That is, the scheduling policy may indicate a transmission priority for the Packet_C', among other stored packets.

In some embodiments, the scheduler 250 may consider different scheduling policies (or combination(s) of different scheduling policies) to prevent resource starvation, such as the type of resource starvation that may preclude a simultaneous parallel packet from becoming dequeued (or popped) from virtual output queue(s). That is, the scheduler 250 may generate a new scheduling policy and/or correct one or more existing scheduling policies. As note in this regard, resource starvation may occur when a packet stored in one or more virtual output queue(s) has a relatively low priority, and therefore, is not transmitted to the memory device 300 during a predetermined period of time.

In view of this possible outcome certain schedulers have used a "weighted-fair scheduling policy" (e.g., weighted-fair queuing). According to the weighted-fair scheduling policy, each virtual queue cluster corresponding to a particular host device may be assigned a different weight. Therefore, assuming there are no priorities among virtual output queues included in a virtual queue cluster, and virtual output queues may store the same number of packets, and transmit the packets to planes in different orders. As a result, the stored packets may be output from the virtual output queue according to a status of each plane. In this case, there is a high probability that a packet corresponding to a single work request occupying only one plane will be output in a timely manner. This relatively high chance of being output arises because the probability of any one plane coming into an idle state is much greater than the probability of multiple planes simultaneously coming into an idle state. Therefore, when single packet(s) and simultaneous parallel packet(s) are stored in virtual output queue(s), the single packet(s) will faithfully be transmitted to corresponding plane(s). However, when single packet(s) and simultaneous parallel packet(s) are stored in virtual output queue(s), a significant probability exists that resource starvation may arise in relation to a simultaneous parallel packet, leaving a command (e.g., a work request) languishing in a virtual output queue.

In view of the foregoing, embodiments of the inventive concept provide operating method(s) that may be performed by storage devices (like storage device 2000 of FIG. 1), die controllers (like die controller of FIGS. 2 and 3) and/or schedulers (like scheduler 250 of FIG. 4) capable of differentiating priorities between single work requests and simultaneous parallel work requests.

For example, the scheduler 250 may assign a higher priority to a particular simultaneous parallel packet, as compared with a particular single packet, in order to better motivate output (e.g., increase the probability of output) of the simultaneous parallel packet, even under circumstances wherein the single packet might be output. Additionally or alternately, the scheduler 250 may assign a virtual output queue storing the simultaneous parallel packet a higher priority than other virtual output queue(s), like the virtual output queue(s) storing single packets. That is, the scheduler 250 may output Packet_C' from virtual output queue(s) according to an appropriate scheduling policy allowing Packet_C' to occupy plane(s).

Figure 5:
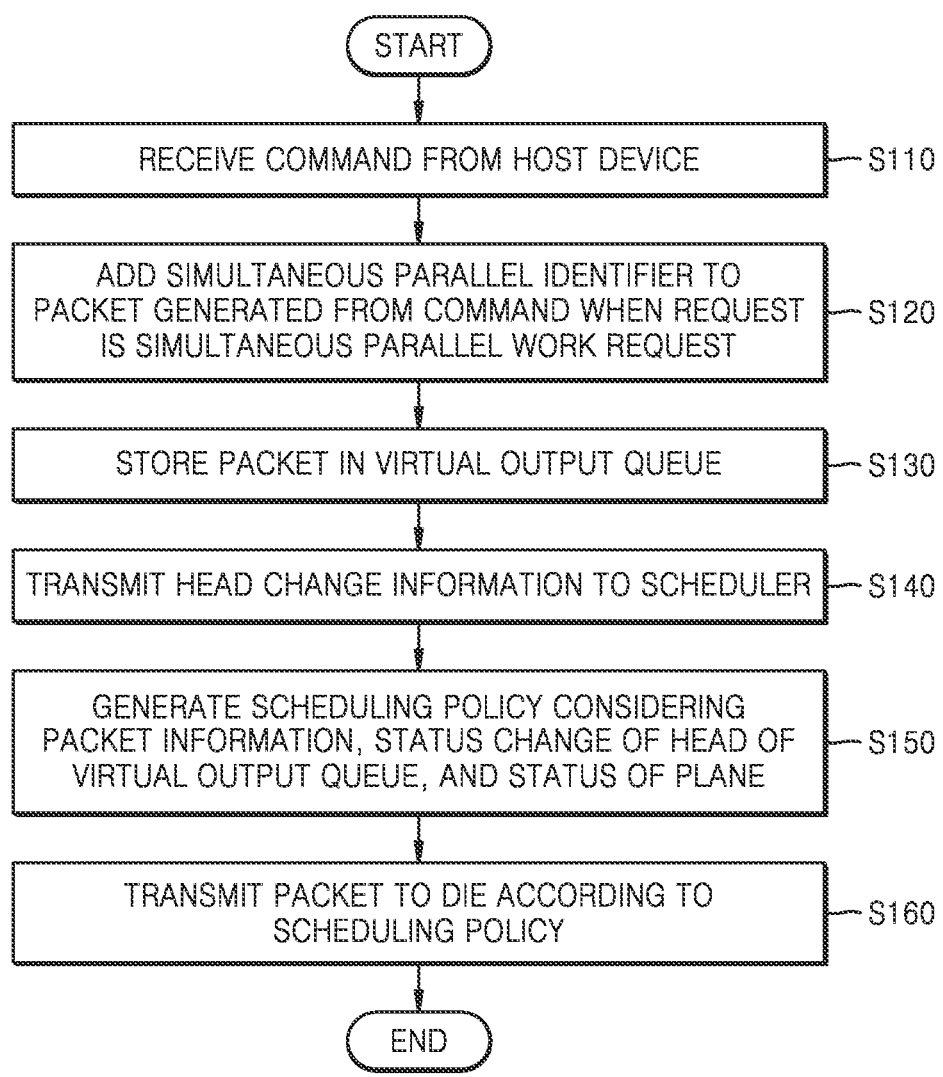
FIG. 5 is a flowchart illustrating in one example a method of operating a memory controller according to embodiments of the inventive concept.

FIG. 5 is a flowchart illustrating in one example a method of operating a memory controller according to embodiments of the inventive concept.

Referring to FIGS. 1, 4, and 5, the memory controller 100 may receive a command CMD associated with a work request from the host device 1000 (S110). Thereafter, the memory controller 100 may generate the original packet Packet_C in response to the command CMD.

Thereafter, the memory controller 100 may determine whether the work request associated with the command CMD is a simultaneous parallel work request, and upon determining that the work request associated with the command CMD is a simultaneous parallel work request, adding (or setting) a simultaneous parallel identifier to the original packet Packet_C to generate a modified packet Packet_C' (S120). (Of note, in some embodiments, the memory controller 100 may not add (or set) the simultaneous parallel identifier in relation to a single packet).

The memory controller 100 may then store the modified packet Packet_C' in at least one virtual output queue(s) in the virtual queue cluster 240 based on information associated with the modified packet Packet_C' (S130). Here, the memory controller 100 may identify the virtual output queue in which the modified packet Packet_C' should be stored in view of at least one resource (e.g., a plane) associated with the command CMD. For example, if the command generating the modified packet Packet_C' implicates the occupying of the first plane (Plane1) and the second plane (Plane2), the command may be stored in the first virtual output queue VQ1, and the modified packet Packet_C' may be stored in the second virtual output queue VQ2.

The memory controller 100 may then transmit head change information associated with a virtual output queue storing the modified packet Packet_C' to the scheduler 250 (S140). For example, the virtual queue cluster 240 may transmit head change information (Data_Head) related to the second virtual output queue VQ2 and resulting from the storing of the modified packet Packet_C' to the scheduler 250 (S140).

The memory controller 100 may then generate a scheduling policy upon considering the head change information (Data_Head) associated with the modified packet Packet_C', the status of virtual output queue(s), and the status of planes in the memory device 300 (S150). The resulting scheduling policy may define policies that govern the output of the modified packet Packet_C' in relation to a pre-defined output time for various packet(s) stored in virtual output queue(s) in order to prevent resource starvation. As noted above, the memory controller 100 may consider any number of existing scheduling policies, may select a scheduling policy from among the existing scheduling policies, amend an existing scheduling policy, and/or generate a new scheduling policy in order to achieve one or more purpose(s) defining scheduling policies and to avoid resource starvation.

Then, the memory controller 100 may output the modified packet Packet_C' stored in the virtual output queue(s) in accordance with the scheduling policy and transmit the modified packet Packet_C' to the die 411 in the memory device 300.

Figure 6:
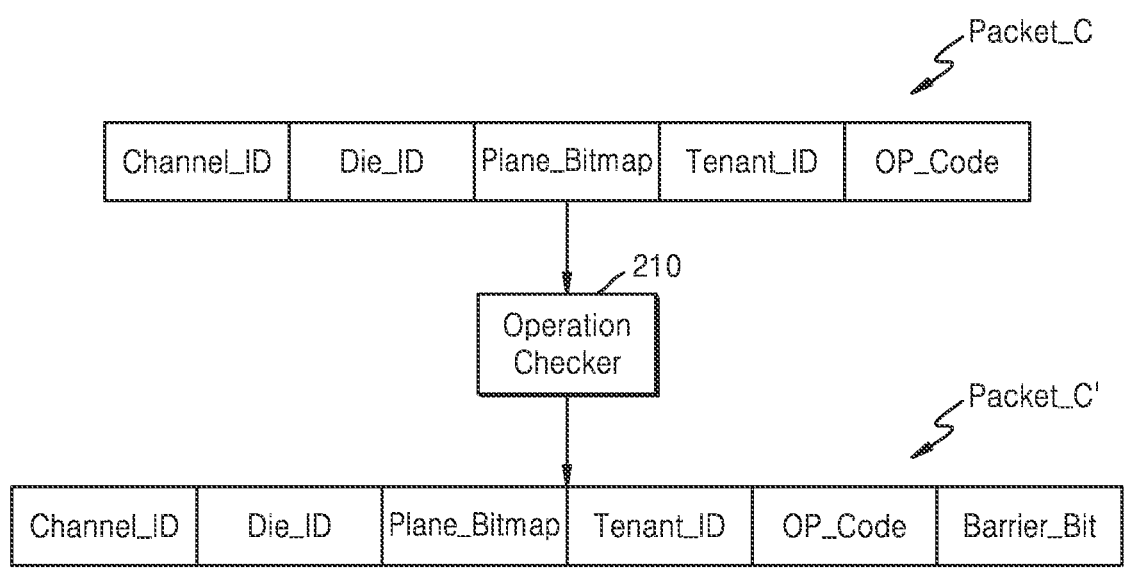
FIGS. 6 and 7 are conceptual diagrams illustrating in various examples a packet structure according to embodiments of the inventive concept.
Figure 7:
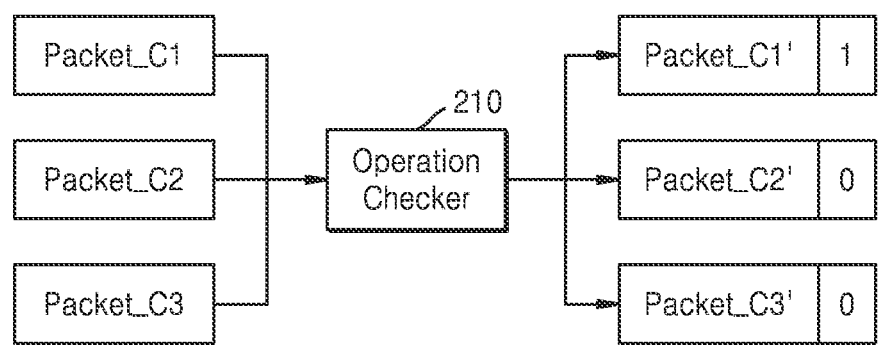

FIGS. 6 and 7 are respective conceptual diagrams illustrating a packet structure and a modified packet structure that may be used in relation to certain embodiments of the inventive concept.

Referring to FIGS. 4 and 6, the original packet Packet_C generated in response to a command CMD indicating a simultaneous parallel work request is assumed to include at least one of channel information (Channel_ID) associated with the work request, die information (Die_ID) associated with the work request, plane information (Plane_Bitmap) identifying plane(s) occupied by the work request, host device information (Tenant_ID) identifying a host device sending the work request, and a type of work request (OP_Code). Here, it is further assumed that a read command is identified by OP_Code 1 and a write command is identified by OP_Code 0.

When the original packet Packet_C is received by the die controller 200, the operation checker 210 may determine whether the original packet Packet_C indicates a simultaneous parallel work request. Upon determining that the original packet Packet_C indicates a simultaneous parallel work request, a simultaneous parallel identifier (e.g., a Barrier_Bit) may be added (or set) to generate a corresponding, modified packet Packet_C'. That is, the nature of the original packet (as indicating either a single work packet or a simultaneous parallel packet) may be clearly distinguished in the modified packet Packet_C' according to the state (e.g., 0 or 1) of the identifier Barrier_Bit. And because the operation checker 210 merely discriminates a simultaneous parallel packet from a single packet in this manner, the operation checker 210 need not necessarily use an identifier (e.g., in relation to a single packet).

For example, referring to FIG. 7, it is assumed that a first packet (Packet_C1) is a simultaneous parallel packet, and each one of second packet (Packet_C2) and a third packet (Packet_C3) is a single packet.

Figure 8:
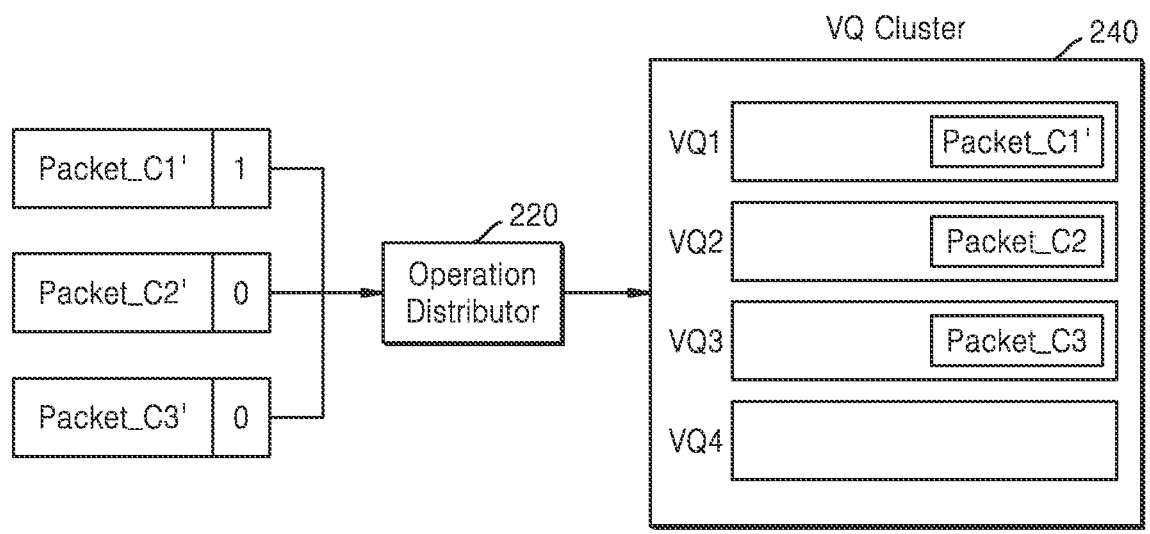
FIG. 8 is a conceptual diagram illustrating in one example a method of operating an operation distributor according to embodiments of the inventive concept.

Therefore, by operation of the checker 210, a simultaneous parallel identifier (e.g., a Barrier Bit) is set to '1' for the first packet Packet_C1 to generate the modified first packet (Packet_C1'), whereas the simultaneous parallel identifier (e.g., a Barrier Bit) is set to '0' for the second packet Packet_C2 to generate the modified second packet (Packet_C2') and the simultaneous parallel identifier (e.g., a Barrier Bit) is set to '0' for the third packet Packet_C3 to generate the modified third packet (Packet_C3'), FIG. 8 is a conceptual diagram further illustrating in one example an operating method for the operation distributor 220 of FIG. 4.

Referring to FIGS. 4 and 8, the operation distributor 220 may identify and forward each packet to a virtual output queue by referring to head information (Data_Head) associated with the received modified packets (e.g., the modified first packet, the modified second packet and the modified third packet, Packet_C1', Packet_C2', and Packet_C3'. That is, the modified first packet, the modified second packet and the modified third packet, Packet_C1', Packet_C2', and Packet_C3' may be stored using the operation distributor 220 and/or the queue controller 230.

In the illustrated example of FIG. 8, the operation distributor 220 is assumed to differently assign virtual output queues among the modified first packet, the modified second packet and the modified third packet, Packet_C1', Packet_C2', and Packet_C3' first. For example, it is assumed that the modified first packet Packet_C1' relates to work occupying both the first plane (Plane1) and the second plane (Plane2), the modified second packet Packet_C2' relates to work occupying only the second plane (Plane2), and the modified third packet Packet_C3' relates to work occupying only the third plane (Plane3).

Accordingly, the operation distributor 220 may assign the first virtual output queue VQ1 packets (either single or simultaneous parallel) that occupy the first plane (Plane1); assign the second virtual output queue VQ2 to packets occupying the second plane (Plane2); and assign the third virtual output queue VQ3 packets occupying the third plane (Plane3). However, many different distribution methods may be used to various embodiments of the inventive concept. In addition, according the status of the virtual output queue(s), a single packet and/or a simultaneous parallel packet may not be assigned to a previously designated virtual output queue.

Figure 9:
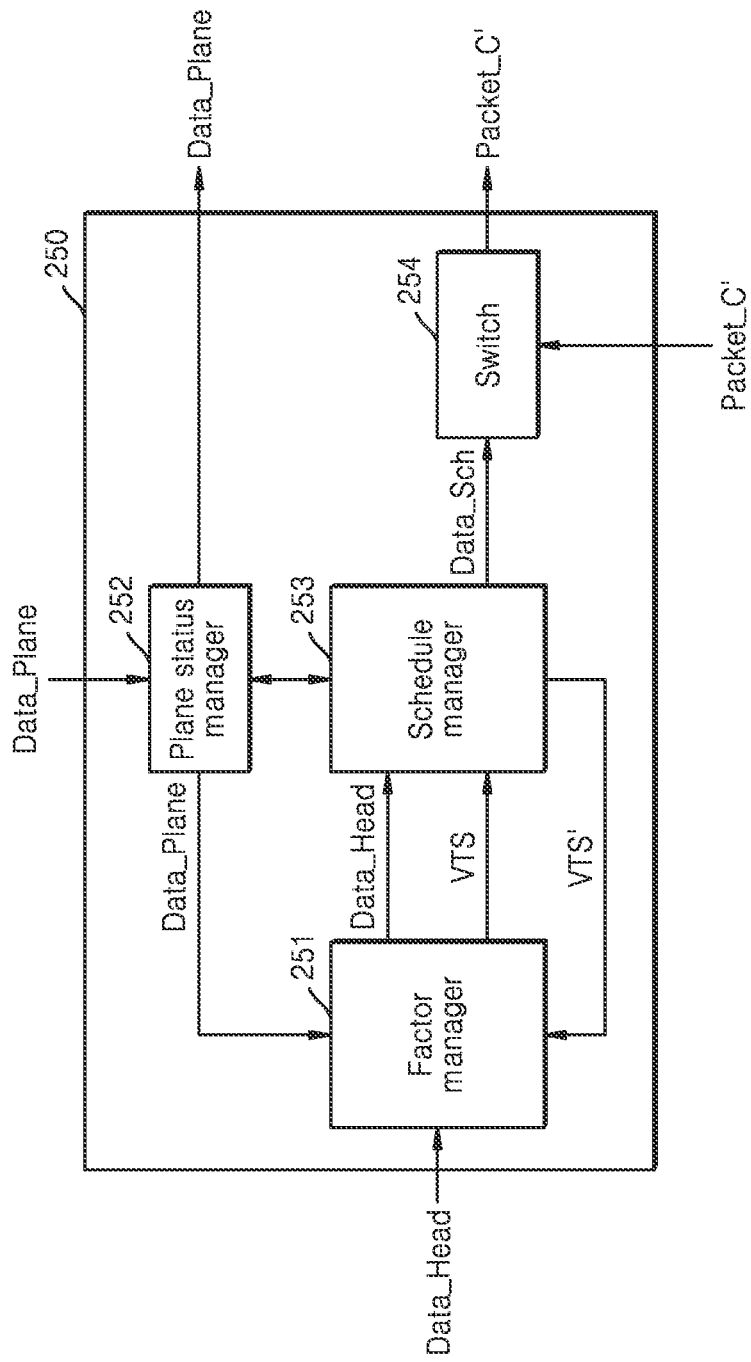
FIG. 9 is a block diagram illustrating in one example the scheduler 250 of the die controller 200 of FIG. 4.

FIG. 9 is a block diagram further illustrating in one example the scheduler 250 of FIG. 4, and FIG. 10 is a conceptual diagram further illustrating operation of the scheduler 250 according to embodiments of the inventive concept;

Referring to FIGS. 4, 9 and 10, the scheduler 250 may include a factor manager 251, a plane status manager 252, a schedule manager 253 and a switch 254.

The factor manager 251 may collect information (e.g., Data_Head) generating a scheduling policy (Data_Sch). For example, the factor manager 251 may collect head information (Data_Head) associated with packet(s) stored in each virtual output queue from the virtual output queues of the virtual queue cluster 240. In addition, the factor manager 251 may collect the plane status information (Data_Plane) associated with the status of each plane among the planes in the memory device 300 using the plane status manager 252.

The factor manager 251 may manage the collected (e.g.,) the foregoing information as illustrated in FIG. 10. Here, the factor manager 251 may manage the plane status information (Data_Plane) related to the status of various planes using a single bit (e.g., 0 or 1). In FIG. 10, the status of the first plane (Plane1) and the status of the third plane (Plane3) is assumed to be idle (e.g., 0), while the status of the second plane (Plane2) and the status of the fourth plane (Plane4) is assumed to be busy (e.g., 1).

Further, the factor manager 251 is assumed to manage information PB_VQ1, PB_VQ2, PB_VQ3, and PB_VQ4 related to which plane is occupied by a packet stored in a head of each virtual output queue. For example, a packet stored in a first virtual output queue may occupy the first to fourth planes (Plane1 to Plane4), and the factor manager 251 may indicate this information PB_VQ1 as '1111'. In addition, a packet stored in a second virtual output queue may occupy the second plane (Plane2), and the factor manager 251 may indicate this information PB_VQ2 as '0010'. A packet stored in a third virtual output queue may occupy the third plane (Plane3) and the fourth plane (Plane4), and the factor manager 251 may indicate this information PB_VQ3 as '1100'. And no packet is stored in a head of a fourth virtual output queue, the factor manager 251 may indicate this information PB_VQ4 as '0000'.

Here, by way of comparison, if the scheduler 250 were to use a weighted-fair scheduling policy as the scheduling policy (Data_Sch), the factor manager 251 might further collect time information VTS, such as a virtual time stamp provided by the host device 1000.

The factor manager 251 may manage information about a head of which one of virtual output queues a simultaneous parallel packet among packets stored in the virtual output queues is located in. For example, information indicating that a simultaneous parallel packet requiring to occupy the first to fourth planes (Plane1 to Plane4) and a simultaneous parallel packet requiring to occupy the third plane (Plane3) and the fourth plane (Plane4) are located in a head of each corresponding virtual output queue and a simultaneous parallel packet requiring to occupy the first plane (Plane1) and the second plane (Plane2) is not located in a head of a corresponding virtual output queue may be managed.

Additionally or alternatively, the factor manager 251 may further collect and manage various scheduling information.

The plane status manager 252 may receive the plane status information (Data_Plane) from planes and transmit the plane status information (Data_Plane) to the factor manager 251 or the schedule manager 253.

The schedule manager 253 may receive information (e.g., VTS, Data_Plane, and Barrier_Bit state) and generate the scheduling policy (Data_Sch) based on the received information. For example, the schedule manager 253 may start scheduling policy generation when a new packet is received by a virtual output queue in the virtual queue cluster 240.

A scheduling policy generation algorithm currently in use by the schedule manager 253 may be selected from a number of algorithms useable by the scheduler 250.

Here, it is assumed that the controlling algorithm used by the schedule manager 253 seeks to output a packet from a virtual output queue within a pre-defined time period, particularly when a simultaneous parallel work request occupies multiple planes. That is, the schedule manager 253 seeks to generate the scheduling policy (Data_Sch) to prevent resource starvation phenomenon for any given packet.

Therefore, the schedule manager 253 may generate the scheduling policy (Data_Sch) related to packets which may be presently output from virtual output queues, and when the scheduling policy (Data_Sch) interrupts output of a packet for a simultaneous parallel work, the schedule manager 253 may amend (or correct) the existing scheduling policy (Data_Sch).

The schedule manager 253 may transmit the amened scheduling policy to the switch 254 and the switch 254 may transmit a packet (e.g., Packet_C') to corresponding plane(s).

Figure 11:
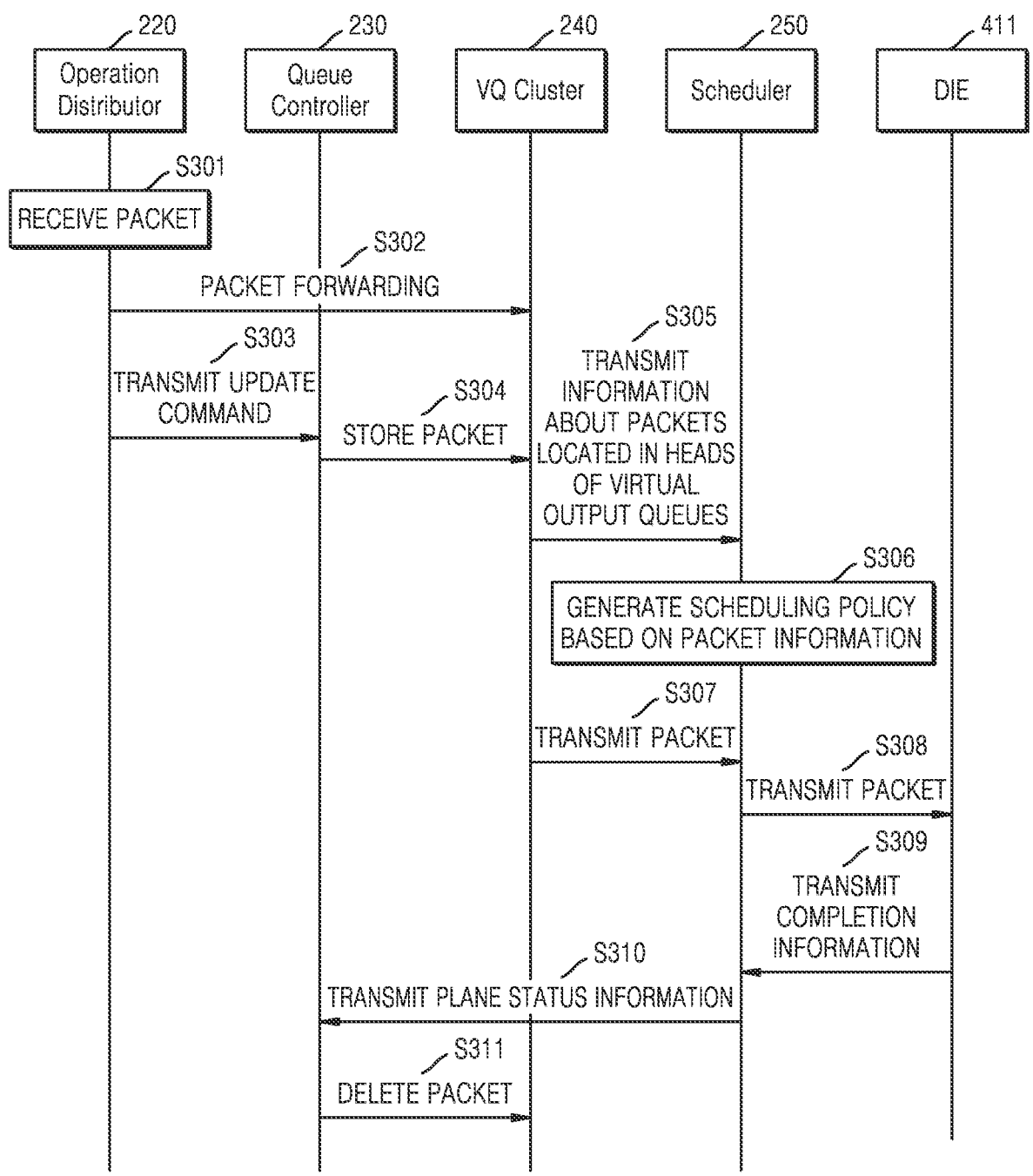
FIG. 11 is a signaling diagram further illustrating in one example a method of operating various components of the data processing system 10 of FIG. 1 consistent with the embodiments described in relation to FIGS. 2 through 9.

FIG. 11 is a signaling diagram further illustrating in one example a method of operating a die controller according to embodiments of the inventive concept.

Referring to FIGS. 4, 9, and 11, it is assumed that the operation checker 210 in the die controller 200 has already received an original packet Packet_C indicating a simultaneous parallel work request and added (or set) a simultaneous parallel identifier to generate the modified packet Packet_C'.

Thus, the operation distributor 220 receives Packet_C' from the operation checker 210 (S301); the operation distributor 220 forwards Packet_C' to the virtual queue cluster 240 (302); the operation distributor 220 transmits an update command to the queue controller 230 to store Packet_C' in a virtual output queue (S303); and the queue controller 230, upon receiving the update command, stores Packet_C' in a virtual output queue of the virtual queue cluster 240 (S304).

After storing Packet_C', the queue controller 230 may transmit the head information (Data_Head) related to packets located at the respective heads of the virtual output queues to the scheduler 250 (S305). The queue controller 230 may also transmit information about other packets otherwise located in the virtual output queues.

The scheduler 250 may generate the scheduling policy (Data_Sch) based on the head information (Data_Head) (S306). Here, the scheduler 250 may consider a variety of information in order to generate the scheduling policy (Data_Sch). For example, the scheduling policy (Data_Sch) generated by the scheduler 250 may consider the presence of simultaneous parallel work packet(s) in the virtual queue cluster 240.

Once the scheduling policy (Data_Sch) is generated, the virtual queue cluster 240 may transmit Packet_C' to the scheduler 250 (S307), and the scheduler 250 may transmit Packet_C' to the die 411 (S308). For example, the switch 254 in the scheduler 250 may be used to transmit Packet_C' to a plane to be occupied by Packet_C'.

The die 411, upon receiving Packet_C', may transmit completion information to the scheduler 250 (S309). The completion information may include plane status information (Data_Plane) for each plane included in the die 411 (e.g., the plane receiving Packet_C' and thereby changing the corresponding plane status information).

The scheduler 250 may then transmit the plane status information (Data_Plane) included in the completion information to the queue controller 230 (S310), and the queue controller 230 may transmit a command to the virtual queue cluster 240 deleting Packet_C' (now completed) from the virtual output queue (S311).

Figure 12:
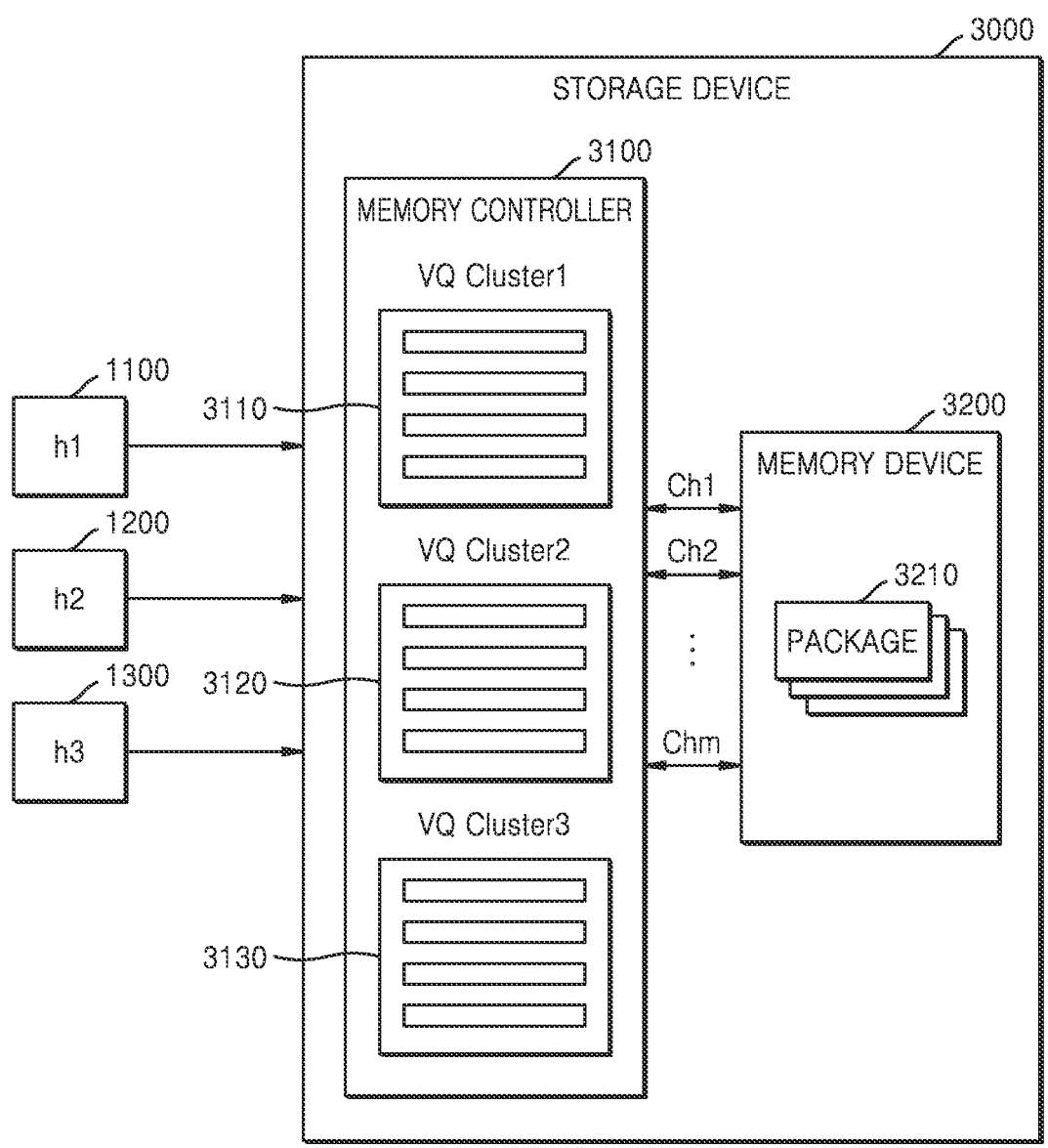
FIG. 12 is a block diagram illustrating a data processing system according to embodiments of the inventive concept.

FIG. 12 is a block diagram illustrating a data processing system 20 according to embodiments of the inventive concept.

Referring to FIGS. 1, 2, 4, 9, and 12, the data processing system 20 may include host devices 1100, 1200, and 1300, each configured to send a command to the storage device 3000. Each of the host devices 1100, 1200, and 1300 may be referred to as a "tenant," and a memory controller 3100 in a storage device 3000 may independently (or separately) process a command received from each of the host devices 1100, 1200, and 1300, and independently (or separately) store each command in queue clusters 3110, 3120, and 3130. Therefore, the storage device 3000 may include multiple queue clusters 3110, 3120, and 3130.

When the storage device 3000 uses a weighted-air scheduling policy, virtual time stamps of the host devices 1100, 1200, and 1300 may differ from each other, and a scheduling policy may be generated based on differences among the virtual time stamps.

For example, the schedule manager 253 in the scheduler 250 may first search a virtual queue cluster 240 corresponding to a host device having the least virtual time stamp value to generate a scheduling policy. When there is a packet waiting to be output in the virtual queue cluster 240, a scheduling policy for outputting the packet may be generated, and the packet may be output. Whether the packet is output may be determined by considering a plane status, information about the packet, and the like.

Otherwise, when there is not a packet waiting to be output in the virtual queue cluster 240, a virtual queue cluster 240 corresponding to a host device having the second least virtual time stamp value may be searched.

While the inventive concept has been particularly shown and described with reference to embodiments thereof, it will be understood that various changes in form and details may be made therein without departing from the spirit and scope of the following claims.

What is claimed is:

1. A storage device communicating with a host device that generates an original packet, the storage device comprising:
   a memory device including a die having multiple planes; and
   a controller, the controller configured to:
      receive the original packet indicating a simultaneous parallel work request that occupies at least two planes among the multiple planes, wherein the controller sets a simultaneous parallel identifier associated with the original packet to generate a modified packet, the modified packet being the same as the original packet except for the simultaneous parallel identifier;
      store the modified packet in at least one virtual output queue of a virtual queue cluster; and
      transmit the modified packet to at least one plane among the multiple planes occupied by the simultaneous parallel work request according to a scheduling policy.

2. The storage device of claim 1, wherein the scheduling policy assigns a higher priority to the modified packet than to a single work packet indicating a single work request from the host device that occupies only a single plane among the multiple planes.

3. The storage device of claim 2, wherein the controller is further configured to determine whether the original packet is the single work packet or a simultaneous parallel work packet indicating the simultaneous parallel work request, and
   to set the simultaneous parallel identifier upon determining that the original packet is the simultaneous parallel work packet.

4. The storage device of claim 3, wherein the controller sets the simultaneous parallel identifier and generates the modified packet by adding a single bit to the original packet.

5. The storage device of claim 3, wherein the controller stores the modified packet in the at least one virtual output queue based on information associated with the modified packet.

6. The storage device of claim 5, wherein the information includes plane information identifying at least one plane among the multiple planes occupied by execution of the simultaneous parallel work request.

7. The storage device of claim 5, wherein the information includes head information associated with the modified packet located at a head of the at least one virtual output queue.

8. The storage device of claim 5, wherein the information includes a type of command associated with the original packet.

9. The storage device of claim 1, wherein upon storing the modified packet in the at least one virtual queue, the controller receives head change information from the virtual queue cluster related to a change in a head of the at least one virtual output queue.

10. The storage device of claim 9, wherein the controller further receives plane status information from the die.

11. The storage device of claim 10, wherein the plane status information includes a busy signal for one plane among the multiple planes currently performing another operation and an idle signal for another plane among the multiple planes not performing another operation.

12. The storage device of claim 10, wherein the controller generates the scheduling policy in response to the head change information and the plane status information.

13. The storage device of claim 1, wherein the scheduling policy prevents resource starvation during execution of the simultaneous parallel work request.

14. The storage device of claim 1, wherein the scheduling policy is a weighted-fair scheduling policy.

15. The storage device of claim 1, wherein the controller assigns a priority higher to one virtual output queue among the at least one virtual queue storing the modified packet than a priority assigned to another virtual output queue among the at least one virtual queue storing a single packet.

16. A method of operating a controller in a storage device communicating with a host device that generates an original packet, wherein the storage device includes a memory device including a die having multiple planes and the controller, the method comprising:
   receiving the original packet indicating a simultaneous parallel work request;
   adding a simultaneous parallel identifier to the original packet to generate a modified packet, the modified packet being the same as the original packet except for the added simultaneous parallel identifier;
   storing the modified packet in at least one virtual output queue of a virtual queue cluster; and
   transmitting the modified packet to at least one plane among the multiple planes according to a scheduling policy,
   wherein execution of the simultaneous parallel work request occupies at least two planes among the multiple planes.

17. The method of claim 16, wherein the scheduling policy assigns a higher priority to the modified packet than to a single work packet indicating a single work request received from the host device, and
   the execution of the single work request occupies only a single plane among the multiple planes.

* * * * *